United States Patent [19]

Horii

[11] Patent Number: 5,781,689
[45] Date of Patent: Jul. 14, 1998

[54] APPARATUS FOR REPRODUCING AUDIO AND IMAGE SIGNALS FROM DIFFERENT AREAS OF A MEDIUM

[75] Inventor: Hiroyuki Horii, Yokohama, Japan

[73] Assignee: Canon Kabushiki Kaisha, Tokyo, Japan

[21] Appl. No.: 735,820

[22] Filed: Oct. 23, 1996

Related U.S. Application Data

[63] Continuation of Ser. No. 297,903, Aug. 31, 1994, abandoned, which is a continuation of Ser. No. 933,572, Aug. 24, 1992, abandoned, which is a continuation of Ser. No. 560,215, Jul. 25, 1990, abandoned, which is a continuation of Ser. No. 290,643, Dec. 27, 1988, abandoned.

[30] Foreign Application Priority Data

Dec. 28, 1987 [JP] Japan ................................. 62-334979
Dec. 28, 1987 [JP] Japan ................................. 62-334980
Dec. 28, 1987 [JP] Japan ................................. 62-334983

[51] Int. Cl.$^6$ .................................................. H04N 5/928
[52] U.S. Cl. .................................... 386/96; 386/105
[58] Field of Search ............................... 386/95, 96, 97, 386/105, 106, 107, 39, 104, 83

[56] References Cited

U.S. PATENT DOCUMENTS

| | | | |
|---|---|---|---|
| 3,987,484 | 10/1976 | Bosche et al. | 360/72.2 |
| 4,009,331 | 2/1977 | Goldmark | 360/19.1 |
| 4,422,105 | 12/1983 | Rodesch | 366/72.2 |
| 4,496,993 | 1/1985 | Sugiyama | 360/72.7 |
| 4,583,132 | 4/1986 | Nakano | 358/341 |
| 4,591,931 | 5/1986 | Baumeistel | 366/13 |
| 4,604,655 | 8/1986 | Moriyama | 358/343 |
| 4,647,985 | 3/1987 | Yokosawa | 358/341 |
| 4,672,471 | 6/1987 | Gouda | 358/341 |
| 4,727,433 | 2/1988 | Dakin | 366/19.1 |
| 4,761,692 | 8/1988 | Yoshida et al. | 358/335 |
| 4,777,537 | 10/1988 | Ueno et al. | 358/341 |
| 4,794,465 | 12/1988 | Van Lutt et al. | 358/341 |
| 4,816,928 | 3/1989 | Sasaki et al. | 358/343 |
| 4,858,028 | 8/1989 | Okino | 358/909.1 |
| 4,858,031 | 8/1989 | Fukuta | 358/342 |
| 5,111,304 | 5/1992 | Kinoshita et al. | 358/341 |
| 5,166,804 | 11/1992 | Takahashi | 358/341 |

*Primary Examiner*—Thai Tran
*Assistant Examiner*—Huy Nguyen
*Attorney, Agent, or Firm*—Fitzpatrick, Cella, Harper & Scinto

[57] ABSTRACT

A reproducing apparatus for reproducing from a medium on which voice and image signals are mixedly recorded in different areas comprises: a reproducing device to reproduce the signal by accessing each area on the medium; an instructing device to instruct the start of reproduction of the voice signal; and a controller for allowing the reproducing device to access to the area in which the voice signal is recorded in response to an instruction from the instructing device when the area which is accessed by the reproducing device is not the area in which the voice signal is recorded. The reproducing device includes: a reproducing head which is movable on the medium; a voice processor to process the reproduction output of the head as a voice signal; an image processor to process the reproduction output of the head as an image signal; and a control circuit for making either the voice processor or the image processor operative. With this apparatus, even if both of the voice and image signals mixedly recorded on a medium, the voice signal can be easily searched or changed in a short time by simple operations.

8 Claims, 10 Drawing Sheets

TRACK FORMAT

FIG. 5B

EMBODIMENT OF SECTOR FORMAT

FIG.6A

| TRACK No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| A / V | V | V | V | V | V | V | V | V | V | V | a1 | a2 | b1 | b2 | b3 |
| AUDIO SEQUECE 1 | | | | a1 | | | a2 | | | | | | | | |
| AUDIO SEQUECE 2 | | b1 | | | | b3 | | b2 | | | | | | | |

FIG.6B

| REPRODUCTION TABLE |||||||||||||||||
|---|---|---|---|---|---|---|---|---|---|---|---|---|---|---|---|---|
| REPRODUCTION ORDER || 1 | 2 | 3 | 4 | 5 | 6 | 7 | 8 | 9 | 10 | 11 | 12 | 13 | 14 | |
| TRACK No. | MODE ① | 11 | 13 | --- | | | | | | | | | | | | |
| | MODE ② | 13 | 11 | --- | | | | | | | | | | | | |
| | MODE ③⑤ | 1 | 3 | 11 | 13 | 5 | 9 | 10 | --- | | | | | | | |
| | MODE ④⑥ | 1 | 13 | 3 | 11 | 5 | 9 | 10 | --- | | | | | | | |

FIG.6C

| IMAGE REPRODUCTION ORDER || 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TRACK No. | MODE ① | 4 | 7⌋ | 2 | 6 | 8⌋ | --- | | | | | | | | | |
| | MODE ② | 2 | 6 | 8⌋ | 4 | 7⌋ | --- | | | | | | | | | |
| | MODE ③ | 1 | 3⌋ | 4 | 7⌋ | 2 | 6 | 8⌋ | 5⌋ | 9 | 10⌋ | --- | | | | |
| | MODE ④ | 1 | 2 | 6 | 8⌋ | 3⌋ | 4 | 7⌋ | 5⌋ | 9 | 10⌋ | --- | | | | |
| | MODE ⑤ | 1 | 3 | 4 | 7 | 2 | 6 | 8 | 5 | 9 | 10 | --- | | | | |
| | MODE ⑥ | 1 | 2 | 6 | 8 | 3 | 4 | 7 | 5 | 9 | 10 | --- | | | | |

⌋ : STOP

APPARATUS FOR REPRODUCING AUDIO AND IMAGE SIGNALS FROM DIFFERENT AREAS OF A MEDIUM

This application is a continuation of application Ser. No. 08/297,903, filed Aug. 31, 1994, now abandoned, which was a continuation of application Ser. No. 07/933,572, filed Aug. 24, 1992, now abandoned, which was a continuation of application Ser. No. 07/560,215, filed Jul. 25, 1990, now abandoned, which was a continuation of application Ser. No. 07/290,643, filed Dec. 27, 1988, now abandoned.

BACKGROUND OF THE INVENTION

1. Field of the Invention

The present invention relates to a reproducing apparatus and, more particularly, to a reproducing apparatus for reproducing a voice signal and an image signal.

2. Related Background Art

Each format of image, voice, and data which are recorded on a video floppy has been standardized by The Electronic Still Video Conference. According to the formats standardized by The Electronic Still Video Conference, it is specified such that both one continuous voice and an image corresponding thereto can be mixedly recorded at different positions on a medium.

As an apparatus for reproducing the voice and image signals from a medium on which both the voice signal and the image signal as shown in such formats were mixedly recorded in different areas, there has been known an apparatus in which a voice signal is once stored into a memory in the apparatus, the voice signal is reproduced as an audible sound, and an image which forms a pair together with the voice signal is searched for on the medium and displayed on a monitor.

However, in such an apparatus, when no voice signal is recorded in an area which is being accessed by a reproducing head, if an operator intends to reproduce a voice signal, prior to instructing the start of the reproduction, it is necessary to manually search the area in which the voice signal was recorded by moving the reproducing head and subsequently instructing the start of the reproduction. Thus, there is a problem in that the operations become very complicated. On the other hand, in the case of reproducing the voice signals from a recording medium on which a series of voice signals as much as a plurality of sequences were continuously recorded with the image signals forming pairs together with the voice signals on a plurality of tracks, there is a problem in that since the voice signal is searched on every track, it is toublesome to search the head of the sequence.

In various kinds of reproducing apparatuses other than the foregoing still video apparatus, such problems also similarly occur in the case where the voice signal and image signal are mixedly recorded into different areas.

SUMMARY OF THE INVENTION

It is the first object of the present invention to provide a reproducing apparatus which can solve individually or all of the foregoing problems.

Another object of the invention is to provide a reproducing apparatus which can search a voice signal in a short time by a simple operation even when voice and image signals mixedly exist on a medium.

Still another object of the invention is to provide a reproducing apparatus in which even if both a voice signal and an image signal mixedly exist on a medium, the voice signal in reproduction can be changed in a short time by a simple operation.

According to a preferred embodiment of the present invention with such objects, there is disclosed a reproducing apparatus for reproducing from a medium on which a voice signal and an image signal were mixedly recorded in different areas, comprising: reproducing means for reproducing by accessing each of the areas on the medium; instructing means for instructing the start of the reproduction of the voice signal; and control means for allowing the reproducing means to access the area in which the voice signal was recorded in response to an instruction from the instructing means in the case where the area which is accessed by the reproducing means is not the area in which the voice signal was recorded.

Further, another object of the invention is to provide a reproducing apparatus having a novel function adapted to the still video standard.

The above and other objects and features of the present invention will become apparent from the following detailed description and the appended claims with reference to the accompanying drawings.

DETAILED DESCRIPTION OF THE PREFERRED EMBODIMENTS

Figure 4:
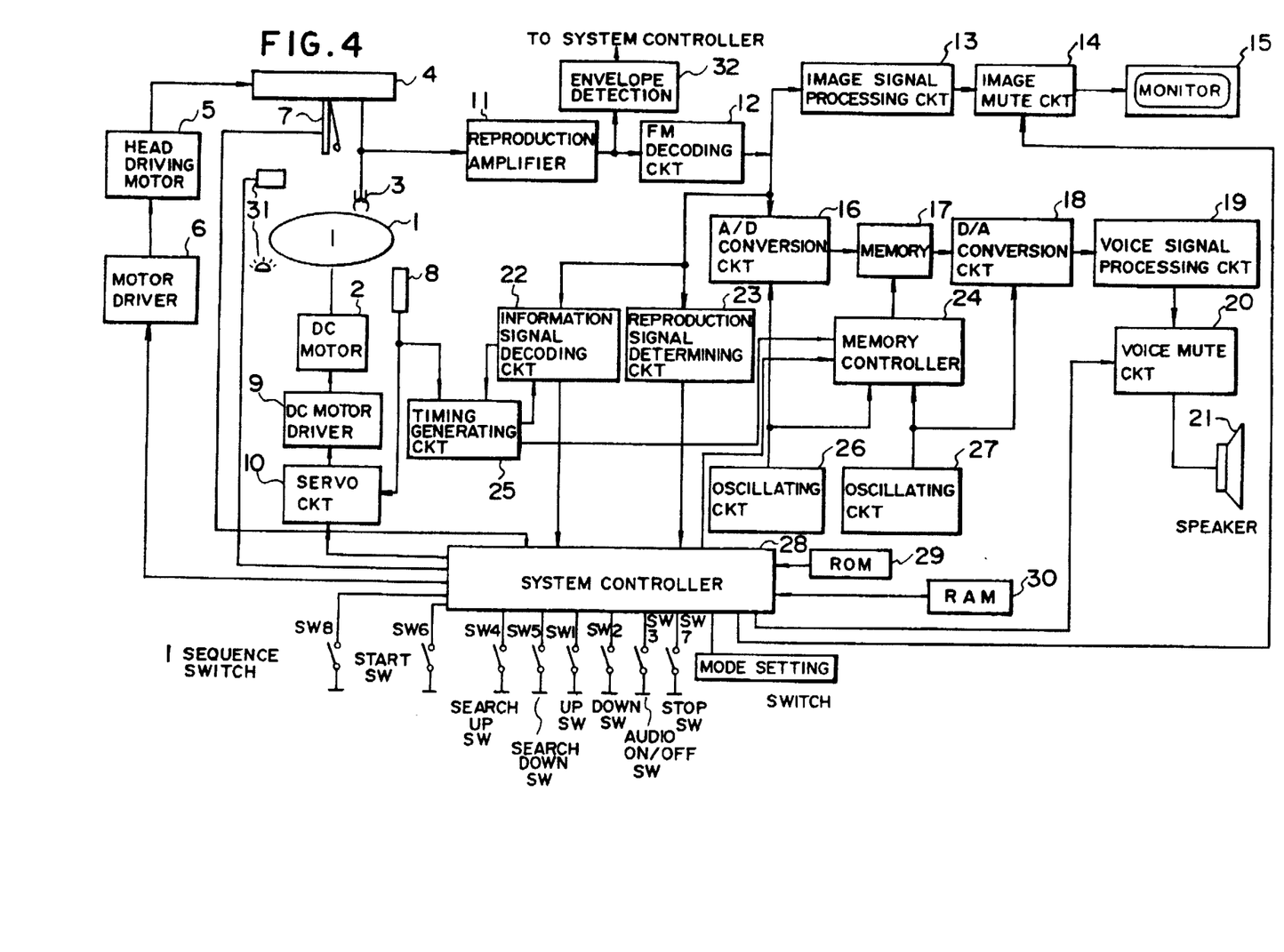
FIG. 4 is a block diagram showing an arrangement of an embodiment of the invention.
Figure 5A:
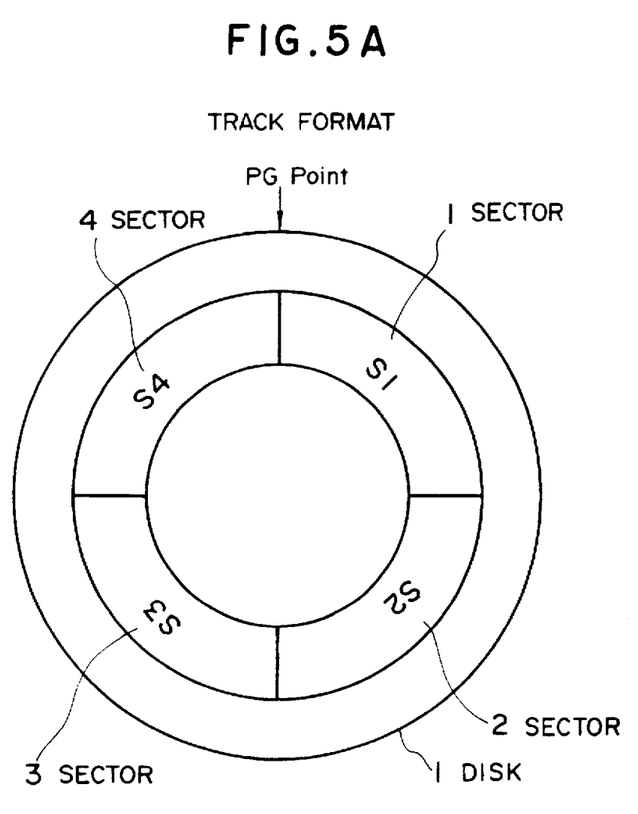
FIGS. 5A and 5B are diagrams showing a recording format in the apparatus of the embodiment.
Figure 5B:
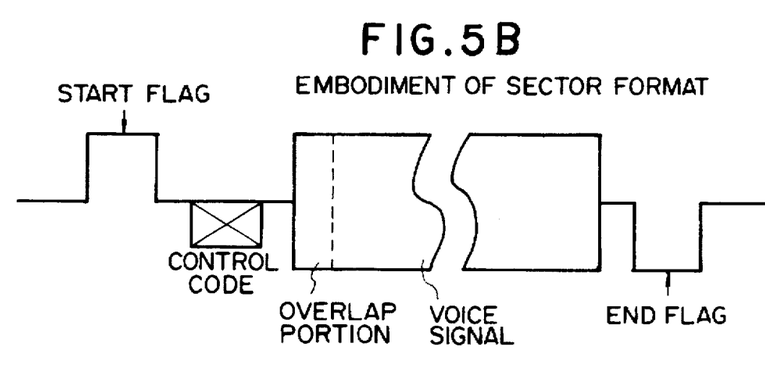

FIG. 4 is a block diagram of an embodiment of the present invention. Reference numeral 1 denotes a magnetic disk; 2 indicates a DC motor to rotate the magnetic disk 1 at a constant velocity; 3 a magnetic head; 4 a head moving mechanism to move the magnetic head 3; 5 a head driving motor to drive the head moving mechanism 4; 6 a motor driver to drive the head driving motor 5; 7 an innermost track detecting switch (SW) which is turned on when the magnetic head 3 accesses the innermost track on the magnetic disk; 8 a PG pulse generator including a PG coil for generating a signal of one pulse every rotation of the magnetic disk; 9 a DC motor driver to drive the DC motor 2; 10 a servo circuit to which an output signal from the PG pulse generator 8 is input and which controls the DC motor driver 9 so as to rotate the magnetic disk at a constant velocity; 11 a reproduction amplifier to amplify an output signal from the magnetic head 3; 12 an FM decoding circuit which receives a signal from the reproduction amplifier 11; and 13 an image signal processing circuit which receives a signal from the FM decoding circuit 12 and is connected to an image mute circuit 14. The muting operation of the image mute circuit 14 is controlled by a system controller 28, which will be explained hereinlater, so that an output to a monitor 15 is limited. Reference numeral 16 denotes an A/D conversion circuit which receives an output of the FM decoding circuit 12. A clock signal is input to the A/D converter 16 from an oscillating circuit 26. Reference numeral 17 denotes a memory to which an output signal from the A/D conversion circuit 16 is input. Addresses in the memory 17 are controlled by a signal from a memory controller 24. The memory 17 has a function to expand the time of a time base compressed voice signal. A D/A conversion circuit 18 converts a digital output signal from the memory 17 into an analog signal. The analog output signal is supplied to a voice signal processing circuit 19 to perform noise reduction and the like on the voice signal. An output of the voice signal processing circuit 19 is supplied to a voice mute circuit 20. The voice mute circuit 20 is a circuit block whose muting operation is controlled by the system controller 28, which will be explained hereinlater. An output of the voice mute circuit 20 is supplied to a speaker 21. Reference numeral 22 denotes an information signal decoding circuit which receives both an output signal from the FM decoding circuit 12 and a signal from a timing generating circuit 25. The information signal decoding circuit 22 decodes a control information signal to reproduce the voice signal recorded on voice signal recording tracks. The decoded control signal is supplied to the system controller 28. A part of the decoded data is also input to the timing generating circuit 25. An output signal of the FM decoding circuit 12 is input to a reproduction signal determining circuit 23. The determining circuit 23 discriminates whether the input signal is the reproduction signal or image signal or not. An output of the determining circuit 23 is input to the system controller 28. For instance, when it is detected that a flag as shown in FIG. 5B is set to "1", the information is determined to be the voice information. If it is detected that the flag is set to "0" and a reproduction envelope is detected by an envelope detection circuit 32, which will be explained hereinlater, the system controller 28 decides that the information recorded on the track is the image signal. The memory controller 24 controls the memory 17 to read and write voice information. The memory controller 24 is a block including a circuit to control the reading and writing operations into and from the memory 17, a circuit to control memory addresses, and the like. A PG pulse from the PG pulse generator 8 and an output signal from the information signal decoding circuit 22 are input to the timing generating circuit 25. The timing generating circuit outputs a timing signal to the decoding circuit 22 and memory controller 24. An oscillating circuit 26 generates a signal serving as a reference clock for the A/D conversion circuit 16 and memory controller 24. An oscillating circuit 27 generates a signal serving as a reference clock for the D/A conversion circuit 18 and memory controller 24. Reference numeral 28 denotes the system controller to control the whole system; 29 indicates an ROM in which a program to control the system controller is stored; and 30 is an RAM whose reading and writing operations are controlled by the system controller 28. $SW_1$ denotes an up switch to instruct the system to move the magnetic head 3 to the inner track; $SW_2$ indicates a down switch to instruct the system to move the magnetic head 3 to an outer track; $SW_3$ is a voice reproduction mode ON/OFF switch to set the voice reproduction mode; $SW_4$ a search up switch to advance the voice sequence to be reproduced to the next sequence; $SW_5$ a search down switch to return the voice sequence to be reproduced to the head of the present sequence or to the one-preceding sequence; $SW_6$ a start switch to instruct the system to start the voice reproduction; $SW_7$ a stop switch to instruct the system to stop the voice reproduction; and $SW_8$ a one sequence mode setting switch to select whether the reproduction of a whole floppy is performed or the reproduction of one sequence is executed.

Reference numeral 31 denotes a magnetic disk detecting mechanism comprising a photo transistor and a light emitting diode. The detecting mechanism 31 is used to detect the presence or absence of a magnetic disk between the photo transistor and the light emitting diode. A detection output of the detecting mechanism 31 is input to the system controller 28. The envelope detection circuit 32 receives an output signal from the reproduction amplifier 11. On the basis of the result of the detection of the reproduction envelope, an information signal indicative of the empty track or the recorded track is input to the system controller 28.

The operation of the embodiment will now be described. It is now assumed that the number of tracks formed on the magnetic disk is set to 50, the track formed on the outermost periphery on the magnetic disk is set to the first track, and the track formed on the innermost periphery on the disk is set to the 50th track. Further, the case where the magnetic head moves to the inner peripheral side on the magnetic disk assumes track up and the case where the magnetic head moves to the outer peripheral side on the disk assumes track down.

Figure 6A:
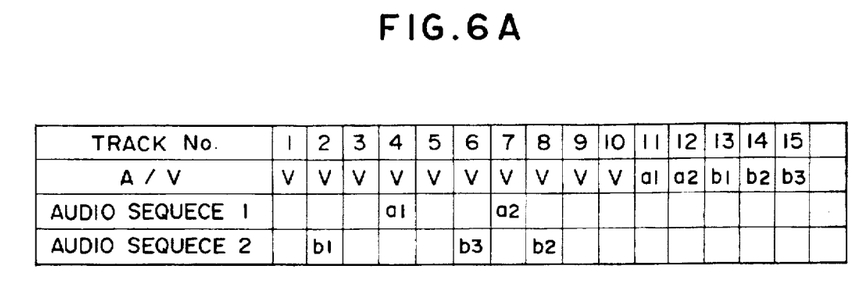
FIGS. 6A, 6B, and 6C are diagrams for explaining a reproducing procedure.

A voice recording format will now be simply described. In this format, the recording positions of the voice signal and image signal are not specified and both the voice and image signals mixedly exist at random. Such an example is shown in FIG. 6A, which will be explained hereinlater. FIG. 5A shows one of the voice tracks formed on the magnetic disk. One voice track is divided into four sectors $S_1$, $S_2$, $S_3$, and $S_4$. FIG. 5B shows an example of a sector format. A start flag, i.e., a start signal of the voice sector is recorded at the start position on one voice sector. Next, the time base compression ratio of the voice signal and the track address of the image signal corresponding to the voice signal are recorded as control codes. And also, in the case where the voice signal is continuously recorded on a plurality of tracks, the track address in which the voice is started and the track address in which the subsequent voice signal is recorded and the like are recorded as control codes for reproduction of the voice signal tracks.

In the description of the embodiment, the voice sequence denotes the series of voice signals recorded on the medium and the image signals corresponding to the voice signals. The signals corresponding to the voice sequence denote the signals constituting the voice sequence.

Figure 1:
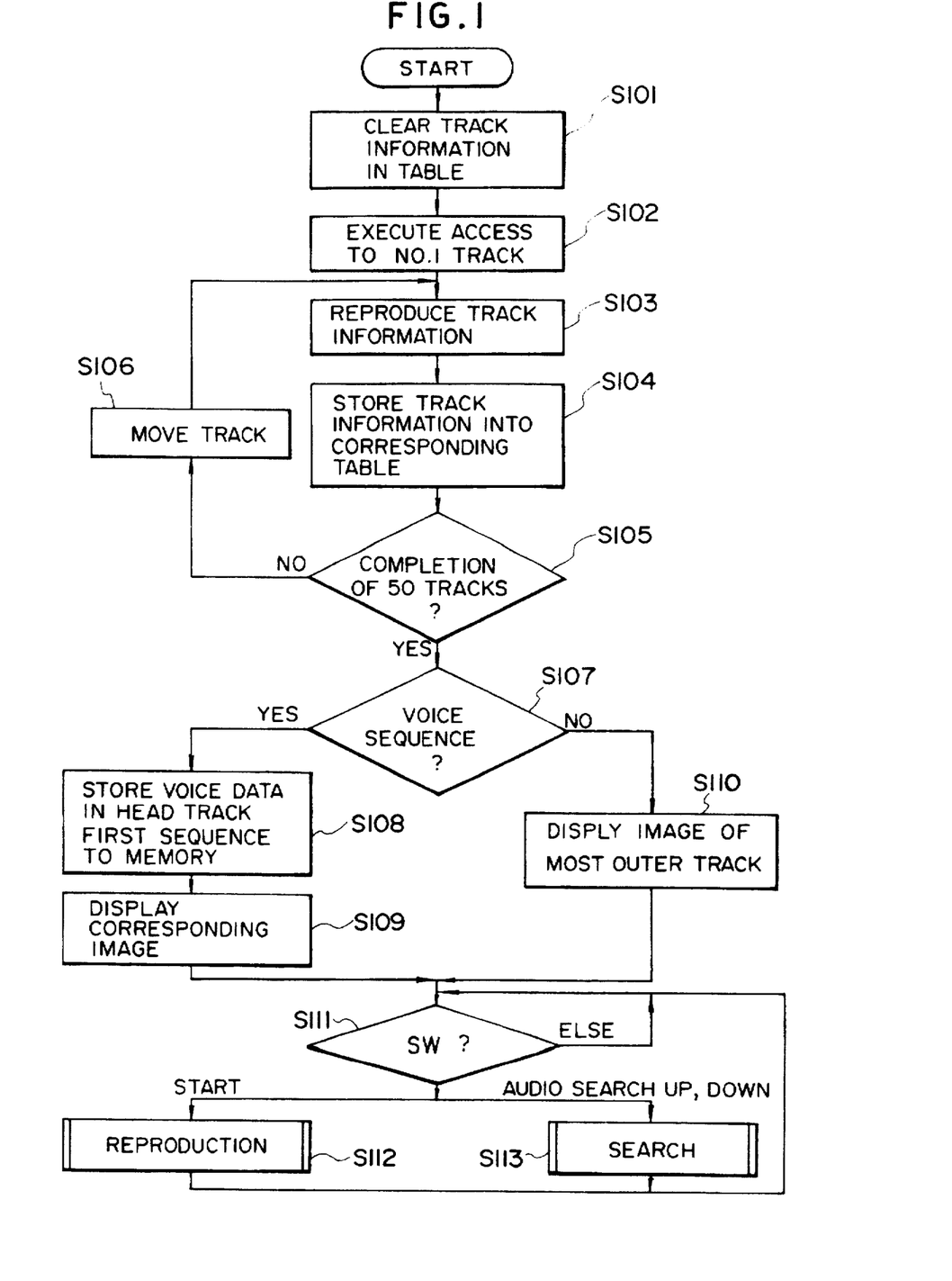
FIGS. 1, 2A, 2B, and 3 are flowcharts showing the operation of an apparatus in an embodiment of the present invention.
Figure 2A:
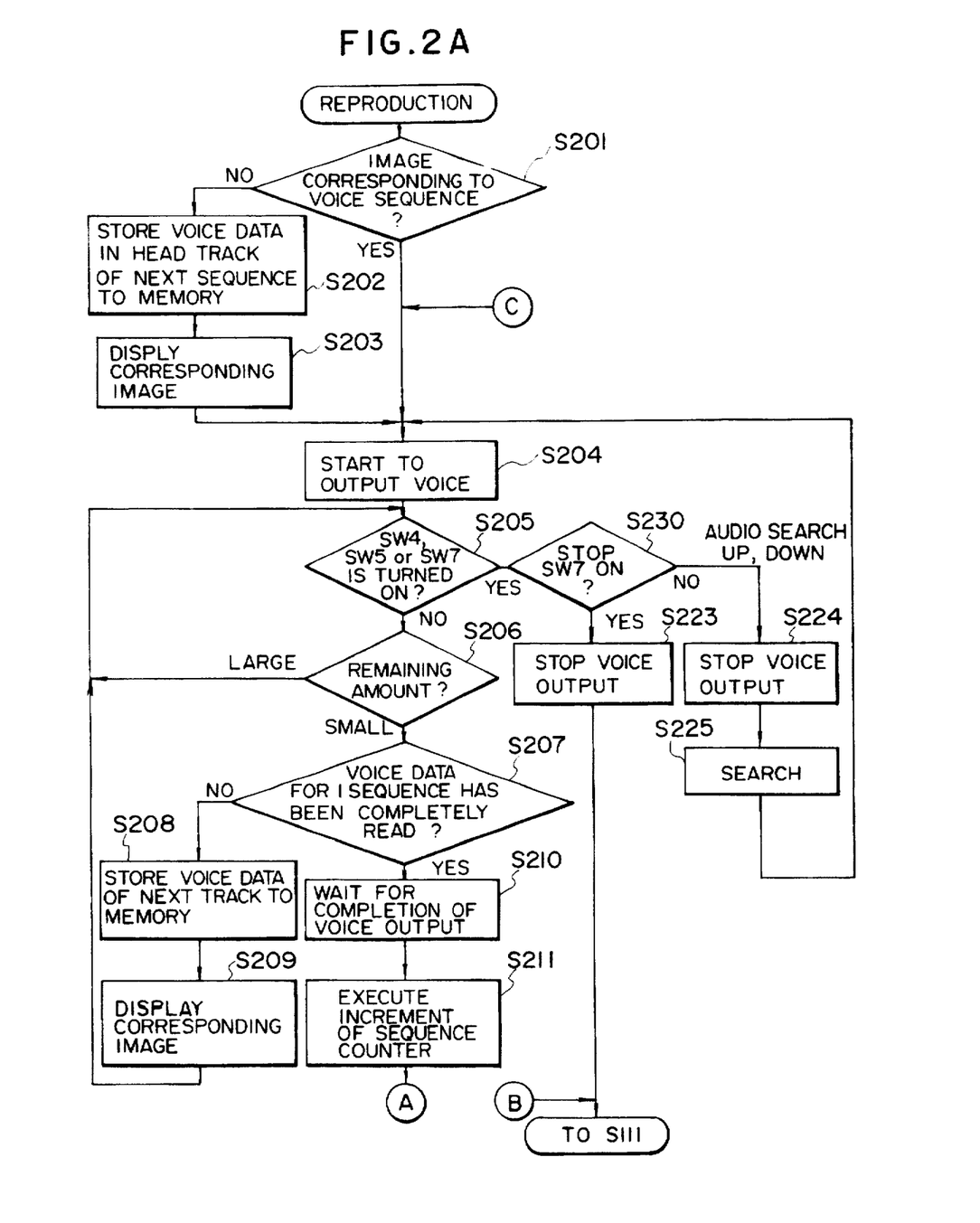
Figure 2B:
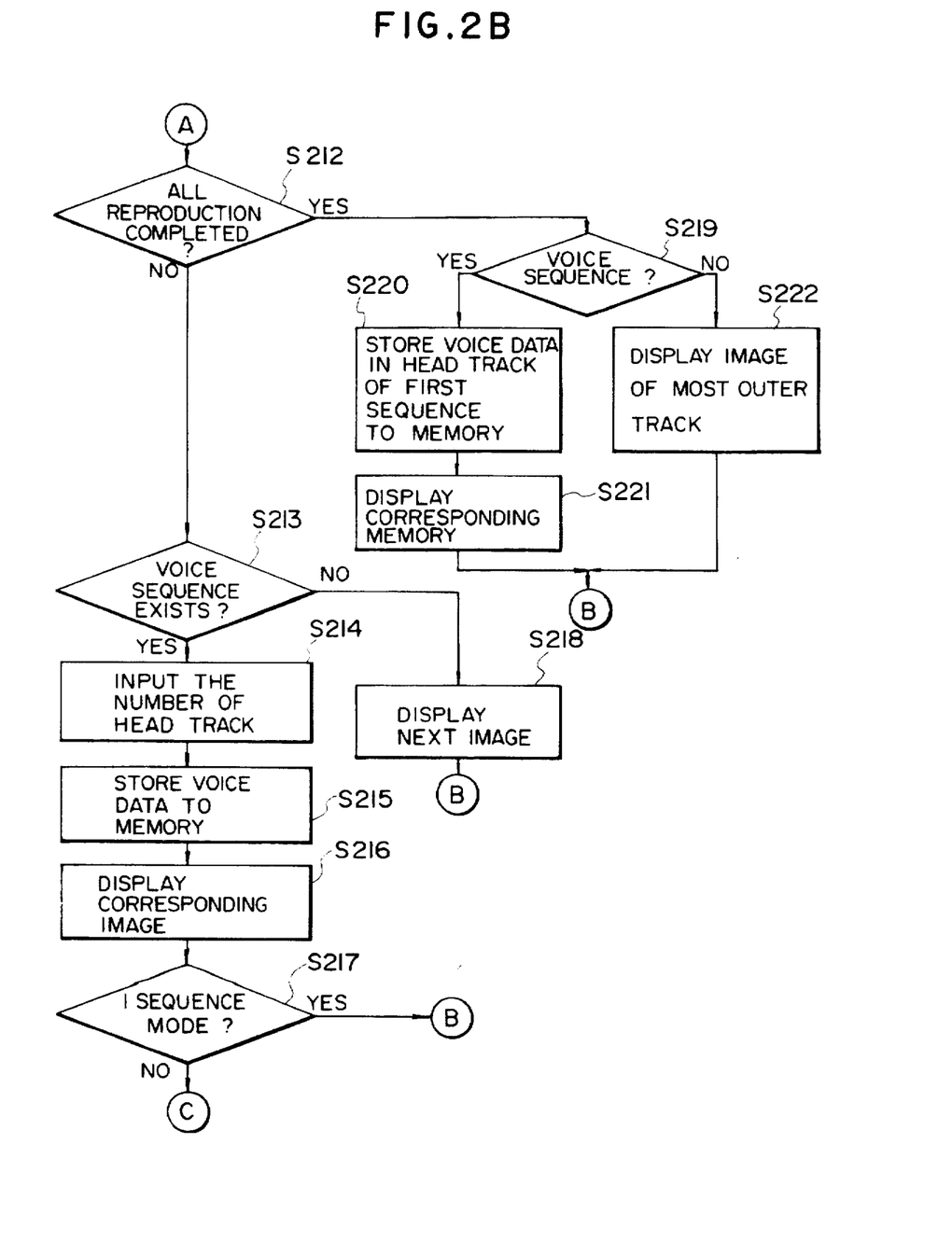
Figure 3:
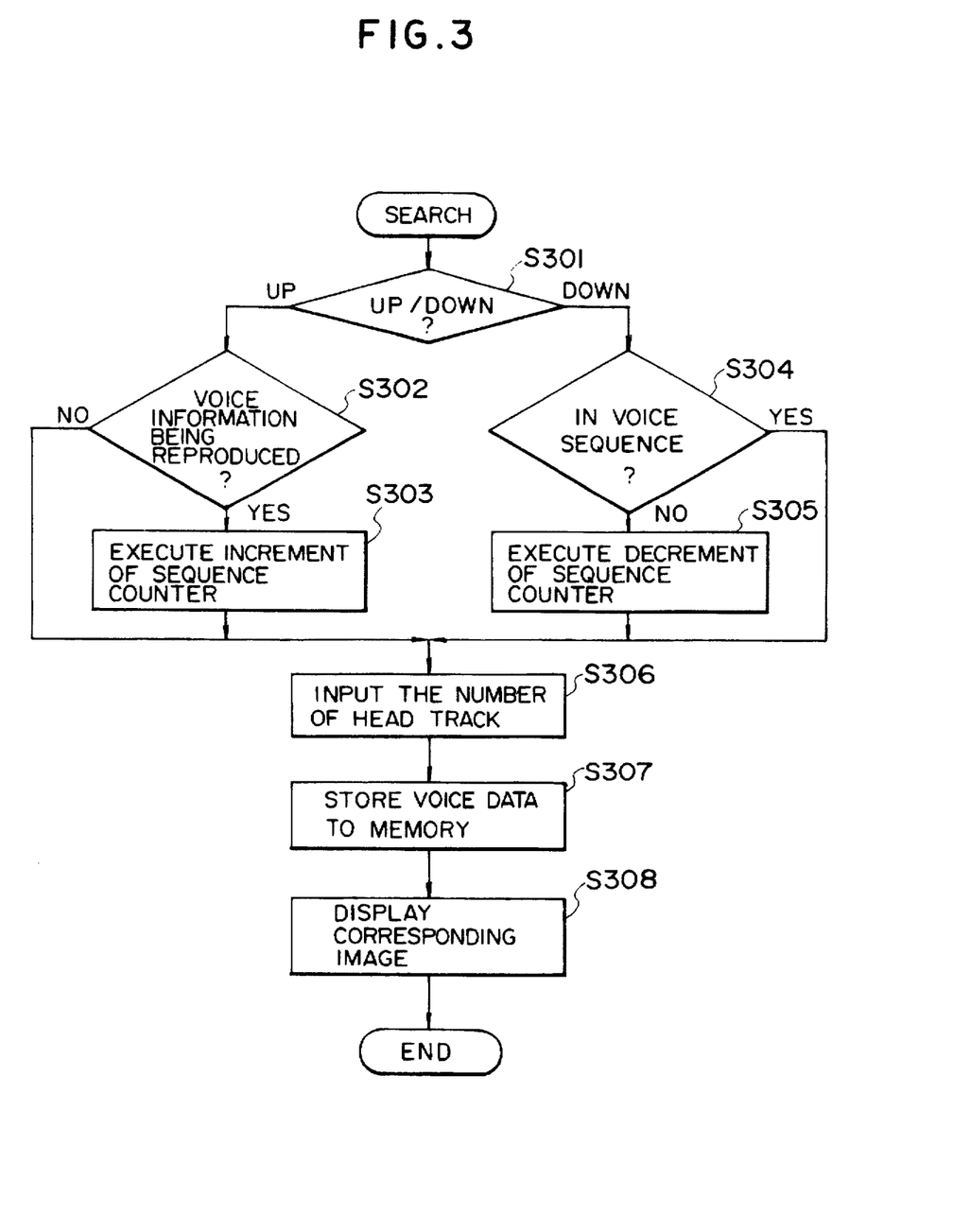

The operation of the embodiment constructed as mentioned above will now be described with reference to a flowchart for the system controller 28. FIGS. 1 to 3 show flowcharts for explaining the operation.

First, the making of a track information table which is used upon reproduction will be described with reference to FIG. 1. When the magnetic disk 2 (hereinafter, also referred to as a video floppy) is set into the apparatus, the areas to store the track information in the RAM 30 are cleared and a count value of a sequence counter, which will be explained hereinafter, is reset to 0 (step S101). The first track formed on the video floppy is accessed by the magnetic head 3 (S102). The information of each track either (1) indicating whether the video track is of the frame type or of the field type, if the accessed track, is the video track or (2) indicating the number of the head track of the sequence, the number of corresponding video track, and the like if the accessed track is the audio track, is then decoded by the information signal decoding circuit 22 and fetched (S103). The reproduced data is stored into a table in the RAM 30 corresponding to each of those information (S104). The number of the track which is at present being accessed is checked (S105). The foregoing operations are repeated with respect to all of the tracks on the video floppy (S103 to S105, S106).

After the track information table of the video floppy which is at present set in the apparatus is completely formed, a check is made to see if the information recorded on the track to be first reproduced, for instance, on the outermost track on the video floppy in the embodiment is the voice sequence (that is, whether it is the voice signal or the image signal corresponding to the voice signal) or the image signal which does not correspond to the voice signal from the track information table (S107). If it is the voice sequence, the head 3 is moved to the head track of the voice sequence including that track and the information is reproduced from this track and stored into the memory 17 (S108). Next, the head 3 is moved to the track on which the image signal corresponding to the voice signal is recorded and the image signal there is reproduced and displayed on the monitor 15 (S109). On the other hand, if the information recorded on the track to be first reproduced is the image signal which does not correspond to the voice signal, only the image signal is displayed and the voice mute circuit 20 is controlled to thereby mute the voice (S110). In this state, the apparatus waits until either the start switch $SW_6$ or the search up/down switches $SW_4$ and $SW_5$ is pressed (S111). If the start switch $SW_6$ is pressed in step S111, the processing routine advances to a reproducing routine S112. If either one of the search up/down switches $SW_4$ and $SW_5$ is pressed, a searching routine S113 follows.

The reproducing routine S112 will now be explained with reference to FIGS. 2A and 2B. In the reproducing routine, a check is made to see if the image displayed, at present, on the monitor 15 is the image corresponding to the voice sequence or not (S201). If YES, since the voice data has already been stored in the voice memory 17 in step S108, the memory controller 24 is driven to read out the voice data from the memory 17 and the voice is immediately output from the speaker 21 (S204). If NO in step S201, the voice sequence to be reproduced next, for instance, the voice signal recorded on the outermost track on the floppy or the image signal having the corresponding voice signal and recorded on the outermost track and the number of the head track are searched from the track information table formed in the RAM 30, and the voice data is stored from the track into the memory 17 (S202). The image corresponding to the voice data is displayed on the monitor (S203). The reading operation of data from the memory 17 is started, the muting operation of the mute circuit 20 is cancelled and the generation of the voice is started (S204). After the start of the voice generation, if none of the switches $SW_4$, $SW_5$, and $SW_7$ is pressed in step S205, the voice data is sequentially stored into the memory 17 until the completion of the voice sequence (S208). The corresponding image is displayed (S209). If it is detected that the stop switch $SW_7$ has been pressed (step S205), the processing routine advances from step S230 to step S223 and the voice generation is stopped (S223). The reproduction is finished and the processing routine is returned to step S111 in FIG. 1. On the other hand, if it is detected that either one of the search up/down switches $SW_4$ and $SW_5$ has been pressed, the processing routine advances from step S230 to step S224 and the voice generation is stopped (S224). The searching routine, which will be explained hereinlater, is executed (S225) and the voice generation is restarted (S204).

During the reproduction of one voice sequence, if the storage of the voice data on the last track of the voice tracks constituting such a sequence into the memory 17 is finished, the processing routine advances from step S207 to step S210 and the apparatus waits until the voice data stored at present in the memory 17 is completely read out (S210). Next, the count value of the sequence counter is increased by "1" so as to enable the voice sequence to be reproduced (S211). A check is then made to see if all the information on the tracks on the video floppy on which both the voice signal and the image signal were recorded as a pair have completely been reproduced or not (S212). If YES, the magnetic head is returned to the track to be first reproduced and the apparatus is set to the standby mode (S212, S219 to S221, S222). The processes in steps S220 and S221 are similar to those in steps S202 and S203. In step S222, the head is moved to the outermost image track on the video floppy. If NO in step S212, a check is made to see if the voice sequence exists or not (S213) in order to reproduce either one of the voice sequence recorded on the inner side than the track on which the information to be reproduced next, that is, the information which has already been reproduced is recorded and on the outermost peripheral side and the image signal which does not correspond to the voice sequence. If it is detected in step S213 that the information to be reproduced next is the voice sequence, the processes in steps S214, S215, and S216 corresponding to the foregoing steps S202 and S203 are executed. If NO in step S213, the process similar to step S110 as mentioned above is executed.

If it is detected in step S213 that the information to be reproduced next is the voice sequence, the head 3 is moved so as to reproduce the information on the first track among the tracks on which the voice information of the voice sequence is recorded and the voice data is reproduced and stored into the memory 17 (S215). Next, step S216 is executed and the corresponding image information is displayed on the monitor 15.

Therefore, since the image corresponding to the voice sequence to be reproduced next can be observed by merely looking at the display content on the monitor 15, the use efficiency is very high.

In the next step S217, a check is made to see if the operating mode is the one sequence mode or not, that is, whether it is the mode to reproduce all of the voice sequences on the video floppy or the one sequence mode which stops the reproduction after one voice sequence was reproduced. If it is the one sequence mode, the processing routine advances to (B) in FIG. 2A and step S111 in FIG. 1 follows.

Therefore, when the one sequence mode has been set, after the voice signal of one sequence and the image signal corresponding to the voice signal are reproduced, the voice reproduction is once stopped. On the contrary, if the one sequence mode is not set, the processing routine advances to step S204 shown in FIG. 2A and the voice signal stored in the memory 17 is read out of the memory controller 24 and the voice is generated from the speaker 21 and the processes in step S204 and subsequent steps are executed. After all of the voice sequences on the video floppy are completely reproduced, the processing routine advances from step S212 to step S219 and the operations similar to those mentioned above are executed.

In the embodiment, after all of the voice sequences on the video floppy are reproduced, the image signal recorded of the outermost track on the video floppy or the image signal corresponding to the track on which the head voice signal of the voice sequence including the voice signal recorded on the outermost track was recorded is reproduced as a visible image on the monitor 15.

Therefore, if the operator desires to observe such an image signal and to again reproduce it, all of the voice sequences on the floppy are reproduced by merely pressing the start switch SW$_6$.

On the other hand, when the start switch SW$_6$ is pressed, if the information recorded on the track which is at present being accessed by the head 3 does not correspond to the voice sequence, the voice sequence near that voice sequence is automatically searched by executing the processes in steps S202 and S203 and reproduced.

The processes in the searching routine S113 which are executed when either one of the search up/down switches SW$_4$ and SW$_5$ has been pressed in step S111, shown in FIG. 1, will now be described with reference to FIG. 3. In such a routine, a check is first made to see if the search up switch SW$_4$ or the search down switch SW$_5$ has been pressed or not (S301).

If the search up operation has been instructed, a check is made at that time to see if the operating mode is in the voice sequence, that is, whether the voice information is being reproduced or not (S302). In the voice sequence, that is, during the reproduction of the voice information, the count value of the sequence counter provided in the system controller 28 is increased by "1" (S303) to execute the next sequence. On the other hand, in step S302, if the information which is reproduced as a visible image by the monitor 15 is the image signal which does not correspond to the voice signal, this means that the sequence counter indicates the voice sequence to be reproduced next, so that step S303 is not executed. The reproduction of the sequence to be reproduced next is prepared (S306 to S308). Steps S306 to S308 are similar to steps S214 to S216. If the search down switch SW$_5$ has been pressed in step S301, step S304 follows and a check is made to see if the voice sequence is at present being executed or not. If NO, in other words, when the information which is being reproduced at that time point is the image signal corresponding to the voice signal recorded on the head track in the voice sequence or the image signal which does not correspond to the voice sequence, the count value of the sequence counter is decreased by "1" (S305), to reproduce the one-preceding sequence. If the voice sequence is being reproduced, in order to reproduce again from the head of the sequence which is at present being reproduced, the count value of the sequence counter is unchanged and the preparation for the reproduction of the voice sequence is performed (S306 to S308).

When the flowchart shown in FIG. 3 is executed by pressing the search up/down switch SW$_4$ or SW$_5$ from step S111 in FIG. 1, the image is merely displayed on the monitor 15 and the voice generation is stopped. Therefore, when the searching routine is executed, the apparatus waits in the state in which the preparation for the reproduction of the voice sequence is made. That is, the voice data recorded on the voice track is once reproduced by the head 3 and stored into the voice memory 17 and the image corresponding to the voice data is displayed. On the other hand, if it is detected in step S205 in the flowchart shown in FIG. 2A that either one of the search up/down switches SW$_4$ and SW$_5$ has been pressed, this means that the searching operation has been indicated in the voice generation. Therefore, the voice generation is once stopped (S224) and the sub routine (S225) to search shown in FIG. 3 is executed. However, if the preparation for the reproduction of the voice sequence is made due to the execution of the sub routine to search, the processing routine advances to step S204. Therefore, the voice generation is immediately started.

That is, when the search up or down switch is pressed during the reproduction of the voice, the voice data of the next sequence is soon reproduced. On the other hand, in the case where the voice is not being reproduced, when the search up or down switch is pressed, the image signal belonging to the next sequence is reproduced but no voice data is reproduced and the apparatus is held stopped. If the operator wants to reproduce the voice signal, it is sufficient to merely press the start switch SW$_6$. As described above, when the searching routine is executed, the head is then moved to the head of a certain voice sequence irrespective of whether the information forming the voice sequence is at present being reproduced or the image signal which does not correspond to the voice sequence is at present being reproduced.

Figure 7:
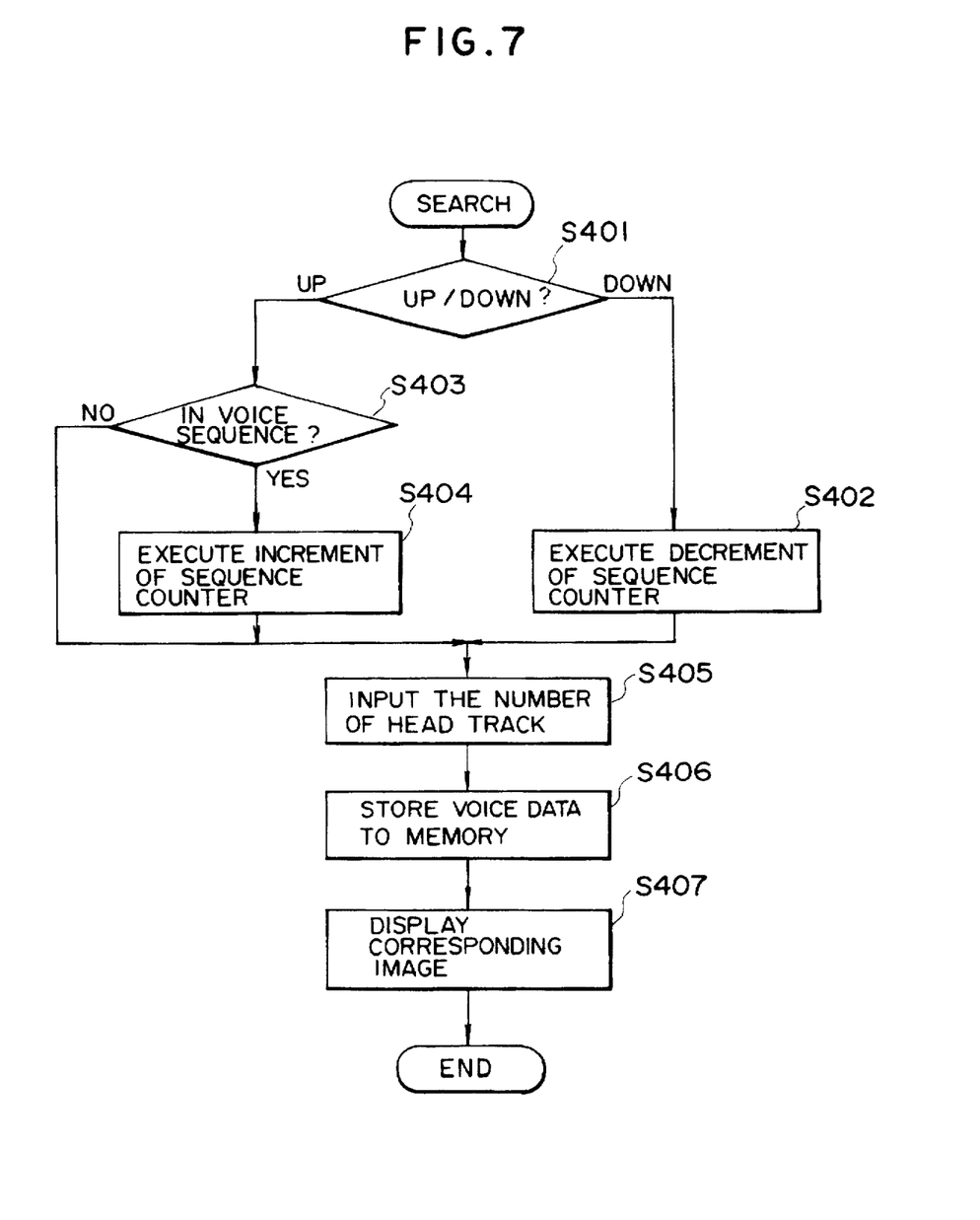
FIG. 7 is a flowchart showing a modification of FIG. 3.

FIG. 7 is a flowchart showing a modification of the searching routine shown in FIG. 3.

In the searching routine which will be explained hereinafter, different from the flowchart shown in FIG. 3, when the search down switch SW$_5$ is pressed, the count value of the sequence counter is decreased by "1" independently of whether the voice is being reproduced or not. Therefore, the head of the voice sequence of the preceding sequence is searched irrespective of the presence or absence of the voice which is generated from the speaker 21. Such a searching routine will be described with reference to FIG. 7.

When the search up or down switch SW$_4$ or SW$_5$ is pressed, the searching routine is started and a check is made to see if which one of the search up/down switches has been pressed (S401). Then, the count value of the sequence counter is decreased by "1" (S402). Thus, the sequence counter indicates the sequence which is preceding by one than the reproducing sequence. After that, the head track number is searched from a table by reference to the table on the basis of the sequence number (S405). The head 3 is moved to that track and the voice data is reproduced and stored into the memory 17 (S406). The corresponding image is displayed (S407).

By constructing the flow as mentioned above, by pressing the search down switch SW$_5$, the preceding voice sequence is searched irrespective of whether the voice is being generated from the speaker 21 or not.

In the flowchart described above, when the one sequence mode is selected as explained in FIG. 2B, if the next voice sequence exists after one voice sequence was reproduced, the image information corresponding to the voice of the head of the next voice sequence is displayed as a visible image on the monitor 15.

Therefore, the user can previously observe the image information corresponding to the next voice sequence.

Figure 8A:
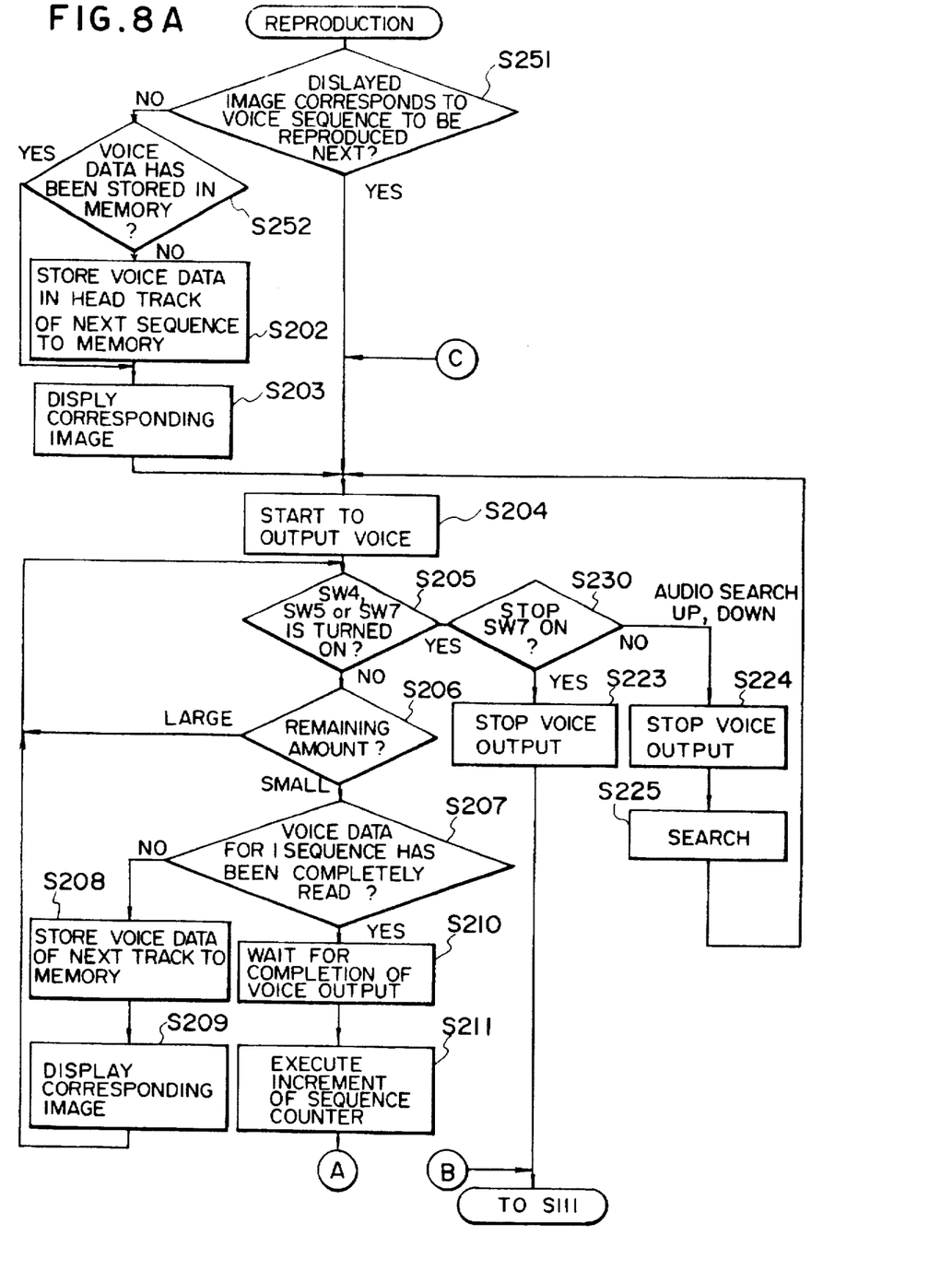
FIGS. 8A and 8B are flowcharts showing a modification of FIG. 2B.
Figure 8B:
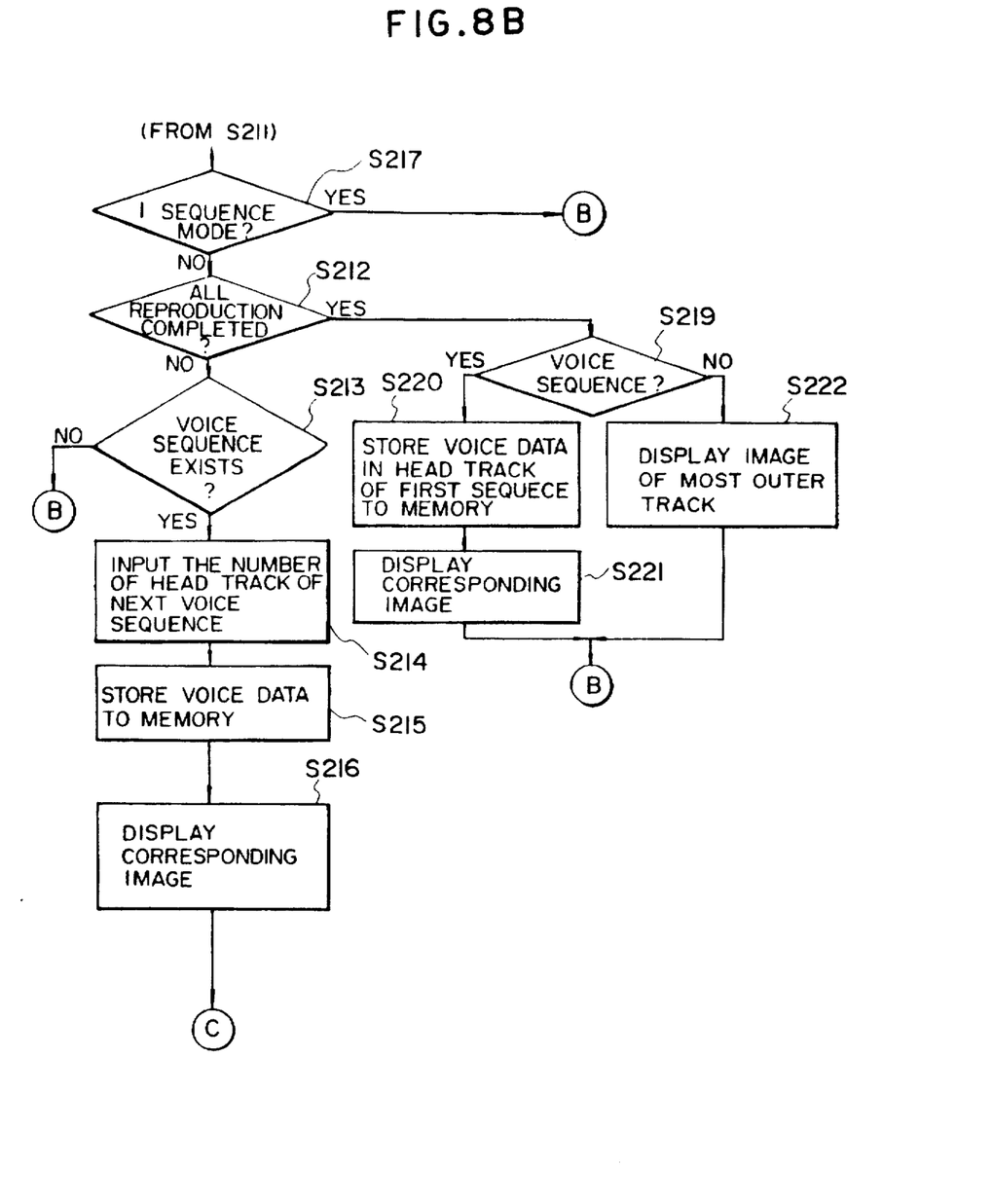

With reference to FIGS. 8A and 8B, an explanation will now be made with regard to an embodiment in which after one voice sequence was reproduced, the image information corresponding to the last voice signal of the voice sequence is continuously displayed as a visible image on the monitor 15, thereby enabling the apparatus to be used without a feeling of disorder.

In FIG. 8B, the steps S212 to S222 shown in FIG. 2B are exchanged as shown in the diagrams. Further, the steps S201 to S204 in FIG. 2A are modified as shown in FIG. 8A.

The operation will now be described hereinbelow.

In the embodiment shown in FIG. 8B, after step S211 in FIG. 8A, a check is made to see if the one sequence mode has been set or not (S217). If YES, the processing routine advances to the step indicated at (B) in FIG. 2A and is returned to step S111. If NO in step S217, a check is made to see if all of the sequences have been finished or not on the basis of the count value of the sequence counter (S212). If NO in step S212, the presence or absence of the next voice sequence is detected (S213). If the next voice sequence exists, steps S214 and S215 are executed and the voice data is stored into the memory 17. The head is moved to the track on which the image information corresponding to the voice data is recorded and the image information is displayed as a visible image on the monitor 15 (S216). If all of the sequences were finished, steps S219 to S221 are executed and the operations similar to those mentioned above are executed.

Therefore, the processes prior to the start of the voice generation shown in FIG. 2A are slightly modified as shown in FIG. 8A.

That is, a check is made to see if the content displayed at present on the monitor 15 is the image corresponding to the voice to be generated next or not (S251). If the final image of the preceding voice sequence is displayed, the voice data to be reproduced next is stored into the memory (S202) and the image corresponding to the voice data is displayed (S203). The voice generation is started (S204).

In the embodiment described above, since step S217 is executed after step S215, if the one sequence mode has been set, when one voice sequence is reproduced, the image information corresponding to the last voice is displayed on the monitor 15 after completion of the reproduction of the voice signal. Therefore, the image information recorded on a medium can be preferably reproduced without giving a feeling of disorder to the user.

The voice track number input from the table by executing the steps S103, S104, and S105 will now be described. In this description, it is fundamentally assumed that the signal recorded on the outer peripheral side on the video floppy has the higher priority. As tables to be read out in steps S108, S202, S208, S214, etc., the tables corresponding to the following reproduction modes are prepared.

(1) Voice sequence preferential mode (first mode):

The signals are reproduced from the outer peripheral side at the head track position of each voice sequence.

(2) Image track preferential voice sequence reproduction mode (second mode):

The signals are reproduced from the outer peripheral side at the video track position corresponding to the head track of each voice sequence.

The first and second modes will now be practically explained with reference to FIGS. 6A to 6C.

FIG. 6A is a diagram showing whether the signal recorded on each track is an image signal or a voice signal. If it is the image signal, the diagram shows that the image signal corresponds to the voice signal on which track. If it is the voice signal, the diagram shows to which voice sequence the voice signal corresponds.

In FIG. 6A, if the signal recorded on each track is the image signal, "V" of a capital letter is shown in the column indicated at A/V. If it is the voice signal, alphabets of small letters are shown in this column. The alphabets of small letters start from "a" and continue as "b" and "c". In the case of the same voice sequence, the alphabet of the same kind is written. Numeral written after each alphabet represents the reproduction order in the voice sequence. In the column shown as an audio sequence, a mark indicating to which voice signal the track on which the image signal is recorded corresponds is written. In the case of the video track corresponding to the voice track indicated at "a", the same mark as that shown in the column of A/V is written in the column shown as a sequence 1. Therefore, for instance, the image signal is recorded on the second track and the image signal corresponds to the voice signal recorded on the voice track indicated at "$b_1$", i.e., on the 13th track in such a diagram.

Figure 6B:
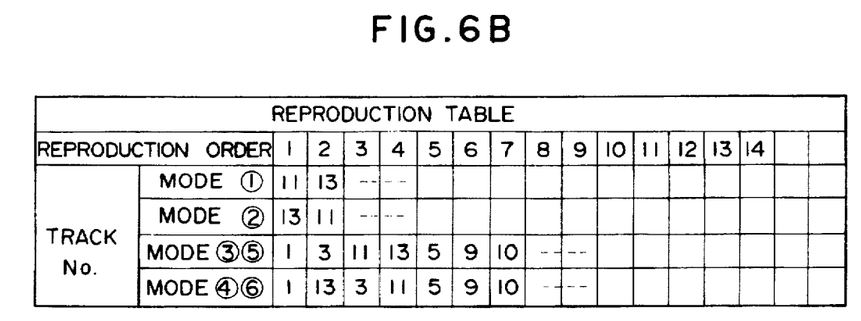

FIG. 6B shows a table referred to in steps S108 and the like to reproduce the signals from the video floppy on which each track is recorded as shown in FIG. 6A as mentioned above. The numbers of tracks to be accessed by the head 11 are sequentially written from the left to the right in accordance with each of the foregoing modes in the column of the track number in FIG. 6B. The moving order of the head to reproduce the image signal when reproducing with reference to each table of FIG. 6B is shown in FIG. 6C. For example, in the first mode, the 11th track is reproduced as the first track to be reproduced. Since the voice signal is recorded on such a track, the head reproduces the 11th track and writes the voice information into the memory 17. After that, the video track, i.e., the fourth track corresponding to the 11th track is reproduced. Next, the voice information written in the memory 17 is read out and reproduced simultaneously with the image signal from the fourth track. In response to that the remaining amount of data stored in the memory 17 decreases the head 3 is moved to the 12th track and the voice information is reproduced from the track and written into the memory 17. The head is moved to the seventh track on which the image signal corresponding to the voice signal on the 12th track is recorded and the operations similar to those mentioned above are executed. In a manner similar to the above, the operations are executed as shown in the diagram.

On the other hand, in the second mode, when a plurality of voice sequences exist, the voice signals are first reproduced from the sequence regarding the image recorded on the outermost track among the tracks on which the images corresponding to each head track are recorded. When explaining in FIG. 6A, the images corresponding to the head tracks of the voice sequences indicated at "a" and "b" are recorded on the fourth and second tracks, respectively. Therefore, in the second mode, the voice sequences shown at "a" are sequentially reproduced. The voice sequences shown at "b" are successively reproduced.

In the foregoing first and second modes, the image signal to which the voice signal does not correspond is skipped without being reproduced.

Therefore, upon reproduction, since an image is always displayed by the monitor and a voice is also simultaneously generated from the speaker, the use efficiency is very good.

A mode which can sequentially reproduce image signals which are skipped in the first and second modes will now be described.

First, in a third mode, in addition to the operations in the first mode, when the head is moved from the outer peripheral side, the track on which the corresponding voice signal is not recorded is further preferentially reproduced and the first mode is then executed.

An example of such a mode will now be described.

In such a case, the image signals having no corresponding voice signal, that is, the signals on the first and third tracks are reproduced from the outer peripheral side. The second track is skipped since it corresponds to the voice sequence to be reproduced at the second time in the first mode. Next, each tarck which belongs to a series of voice sequences including the image signal recorded on the fourth track is reproduced. After completion of the voice sequences, a series of voice sequences including the image signal on the second track are reproduced.

The third mode is executed as mentioned above. Since the fourth mode corresponds to and is similar to the second mode, its description is omitted here.

In the fourth mode, the track number of the image signal corresponding to the head track of each voice sequence is compared with the number of track having no corresponding voice signal. The tracks are reproduced from the smaller track number.

Figure 6C:
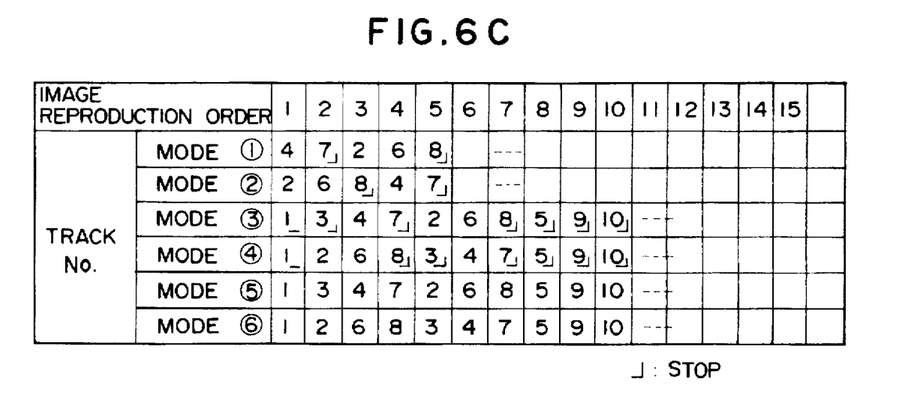

In the third and fourth modes, the movement of the head is automatically inhibited at timings indicated by timing marks (stop mark "]") shown in FIG. 6C. This state is maintained until either one of the search up/down switches $SW_4$ and $SW_5$ and the start switch $SW_6$ is pressed. However, in the fifth and sixth modes, the movement of the head in the third and fourth modes is not inhibited, in other words, the access position of the head is always automatically updated for a set interval time.

In the first and second modes, the movement of the head is also automatically inhibited at the timings shown by the stop marks "]" shown in the diagram. However, such an inhibition is performed in the case where the one sequence mode is set by the one sequence switch $SW_8$.

As described above, according to the embodiment, since each track information is previously searched and managed and the operations are executed in a predetermined mode, even in the case of a medium on which both the voice signal and the image signal are mixedly recorded, the whole medium can be preferably reproduced.

Although the embodiments have been described with respect to the disk-shaped recording medium, the invention is not limited to such a medium but can also use a tape-shaped or card-shaped medium. A solid state memory such as a semiconductor memory or the like can be also used.

In the embodiment, by providing the start switch and the track information table, a voice can be generated by merely pressing the start switch in a state in which the reproducing head is located at an arbitrary position irrespective of whether the area which is accessed by the head is in or out of the area in which the information forming the voice sequence is recorded. The operation to search the voice sequence as in the conventional apparatus becomes unnecessary.

On the other hand, according to the embodiment, in dependence on whether the one sequence mode is set or not, it is possible to select whether only one of a plurality of voice sequences which are recorded on a medium is reproduced or all of the voice sequences are automatically reproduced in accordance with a predetermined order. Thus, the use efficiency is very good.

In such a one sequence mode, as the image to be displayed by the monitor when the voice generation is once stopped, the image corresponding to the voice signal which has already been reproduced is reproduced, so that a reproducing apparatus which can be easily used can be provided.

In the one sequence mode, as the image to be displayed on the monitor when the voice generation is once stopped, the image corresponding to the head voice of the subsequent voice sequence is reproduced, so that a reproducing apparatus which can be easily used can be provided.

According to the embodiment, by providing the search up/down switches $SW_4$ and $SW_5$, even in the case where a plurality of voice sequences exist on the medium or where the images which do not correspond to voices mixedly exist on the medium, the head of the necessary voice sequence can be easily searched and reproduced.

As described above, according to the embodiment, when reproducing the voice signal from a medium on which voice sequences consisting of a series of voice signals and image signals are recorded, the user can execute the reproduction by simple operations, so that there is an advantage such that the operability is improved.

What is claimed is:

1. A signal reproducing method for reproducing a signal recorded on a recording medium having a plurality of recording areas, wherein a plurality of audio sequences are recorded on the recording medium, each audio sequence consisting of at least one audio signal and at least one respective first image signal corresponding thereto, wherein a plurality of second image signals are also recorded on the recording medium, each second image signal having no audio signal corresponding thereto, and wherein each of the audio signals, first image signals and second image signals is recorded in a respective, different one of the recording areas, said method comprising:

a step of discriminating whether a signal recorded in each recording area is one of the audio signals, one of the first image signals or one of the second image signals;

a step of instructing a start of a reproducing operation from a selected one of the recording areas;

a first reproducing step, operative in response to said instructing step when the signal recorded in the selected recording area is one of the audio signals, for reproducing the one audio signal and storing the reproduced audio signal in a memory, then reproducing the respective first image signal corresponding to the reproduced audio signal, and then reading out the reproduced audio signal from the memory;

a second reproducing step, operative in response to said instructing step when the signal recorded in the selected recording area is one of the first image signals, for reproducing the respective audio signal corresponding to the one first image signal recorded in the selected recording area and storing the reproduced audio signal in the memory, then reproducing the one first image signal, and then reading out the reproduced audio signal from the memory; and a third reproducing step, operative in response to said instructing step when the signal recorded in the selected recording area is one of the second image signals, for reproducing the one second image signal.

2. A method according to claim 1, wherein said instructing step comprises manually operating a single switch to instruct the start of the reproducing operation.

3. A method according to claim 1, wherein the recording medium is a disk-shaped medium and the recording areas are formed as concentric tracks on the disk-shaped medium.

4. A method according to claim 1, further comprising the steps of:

providing a reproducing operation change instruction for instructing a change of the reproducing operation; and changing the reproducing operation in response to the reproducing operation change instruction to select another recording area.

5. A signal reproducing method for reproducing a signal recorded on a recording medium having a plurality of recording areas, wherein a plurality of audio sequences are recorded on the recording medium, each audio sequence consisting of at least one audio signal and at least one respective image signal corresponding thereto, and wherein each of the audio signals and image signals is recorded in a respective, different one of the recording areas, said method comprising:

a step of discriminating whether a signal recorded in each recording area is one of the audio signals or one of the image signals;

a step of instructing a start of a reproducing operation from a selected one of the recording areas;

a first reproducing step, operative in response to the instructing step when the signal recorded in the selected recording area is one of the audio signals, for reproducing the one audio signal and storing the reproduced audio signal in a memory, then reproducing the respective image signal corresponding to the reproduced audio signal, and then reading out the reproduced audio signal from the memory; and a second reproducing step, operative in response to the instructing step when the signal recorded in the selected recording area is one of the image signals, for reproducing the respective audio signal corresponding to the one image signal recorded in the selected recording area and storing the reproduced audio signal in the memory, then reproducing the one image signal, and then reading out the reproduced audio signal from the memory.

6. A method according to claim 5, wherein said instructing step comprises manually operating a single switch to instruct the start of the reproducing operation.

7. A method according to claim 5, wherein the recording medium is a disk-shaped medium and the recording areas are formed as concentric tracks on the disk-shaped medium.

8. A method according to claim 5, further comprising the steps of:

providing a reproducing operation change instruction for instructing a change of the reproducing operation; and changing the reproducing operation in response to the reproducing operation change instruction to select another recording area.

* * * * *